United States Patent [19]

Rover

[11] Patent Number: 5,309,937
[45] Date of Patent: May 10, 1994

[54] FLOAT VALVE FOR FILLING SYSTEMS, IN PARTICULAR, FOR FILLING ELECTRIC TRACTION BATTERIES

[76] Inventor: Daniel Rover, SchloBstr. 101, D-8037 Olching, Fed. Rep. of Germany

[21] Appl. No.: 781,231
[22] PCT Filed: May 2, 1991
[86] PCT No.: PCT/DE91/00368
§ 371 Date: Feb. 20, 1992
§ 102(e) Date: Feb. 20, 1992
[87] PCT Pub. No.: WO91/17577
PCT Pub. Date: Nov. 14, 1991

[30] Foreign Application Priority Data

May 2, 1990 [DE] Fed. Rep. of Germany ....... 4014103

[51] Int. Cl.$^5$ .................. F16K 31/24; H01M 2/36
[52] U.S. Cl. .................. 137/260; 137/429; 141/198; 429/64; 429/76
[58] Field of Search ............ 137/260, 261, 429, 433, 137/430, 434; 141/198; 429/64, 76

[56] References Cited

U.S. PATENT DOCUMENTS

| | | | |
|---|---|---|---|
| 1,266,425 | 5/1918 | Detro | 137/260 |
| 1,396,172 | 11/1921 | Fear | 429/64 |
| 1,469,963 | 10/1923 | Sartakoff | 137/260 |
| 1,471,362 | 10/1923 | Sartakoff | 137/260 |
| 1,530,430 | 3/1925 | Skelton | 137/260 |
| 1,842,292 | 1/1932 | Sartakoff | 137/260 |
| 1,942,908 | 1/1934 | Swain et al. | 137/260 |
| 4,353,968 | 10/1982 | Boyle | 137/260 |
| 4,386,141 | 5/1983 | Weidner et al. | 137/260 |
| 4,517,261 | 5/1985 | Whittlesey | 429/64 |
| 4,696,874 | 9/1987 | Tadiello | 429/64 |
| 4,751,156 | 6/1988 | Olimpio | 137/260 |

FOREIGN PATENT DOCUMENTS

| | | | |
|---|---|---|---|
| 74400025 | 4/1975 | Fed. Rep. of Germany . | |
| 2939069 | 9/1980 | Fed. Rep. of Germany . | |
| 3150100 | 8/1982 | Fed. Rep. of Germany . | |
| 3725976 | 2/1989 | Fed. Rep. of Germany . | |
| 2423063 | 12/1979 | France | 429/76 |
| 2427692 | 12/1979 | France . | |
| 2525821 | 10/1983 | France | 429/64 |
| 1078026 | 8/1967 | United Kingdom | 429/76 |

Primary Examiner—George L. Walton
Attorney, Agent, or Firm—Davis, Bujold & Streck

[57] ABSTRACT

The invention relates to a float valve (3) for container filling systems, especially for electrical traction battery filling systems, comprising a valve housing (10) that accommodates a valve chamber (11) and a valve head (31), the valve chamber being provided with a filling medium supply inlet (16) and an outlet (17) leading to a container, the valve head (31) being connected to the float via a stem and a float rod (35, 36, 37) and being movably disposed in a valve chamber (11) to open the inlet and the outlet (16, 17) and shut off the outlet (17). To guarantee quick closing action also with low liquid pressures and to prevent dripping in the closed position it is proposed according to the invention that the filling medium be introduced first in a distribution chamber from where it flows into the valve chamber in a manner that it enters the valve chamber in the bottom area of the latter along the entire surface of the side walls and flows uniformly through the valve chamber. The valve head (31) rests in a recess (13) in the bottom of the valve chamber (11) and is for the most part outside the flow during the filling process. Only when it is lifted out of the recess (13) by the float, the valve head (31) is pushed into the closing position by the flow forces.

16 Claims, 6 Drawing Sheets

FLOAT VALVE FOR FILLING SYSTEMS, IN PARTICULAR, FOR FILLING ELECTRIC TRACTION BATTERIES

The invention relates to a float valve described in the characterizing clause of claim 1 hereto.

Float valves of this type are used in filling systems for filling containers, e.g. for filling electric traction batteries, with distilled/purified water following charging. Float valves of this type are preferably disposed within a plug which can be inserted into an opening of the container to be filled, e.g. into the filling opening of a traction battery. Disposed within the chamber of the float valve is a valve head with a valve steam which is connected to a float rod extending downwards through the plug into the container and bears at its end a float. As soon as the desired liquid level has been reached when filling the container, the float will be lifted, causing the valve head to close the valve.

Normally, filling systems are designed for filling several containers so that a corresponding number of float valves is used all of which are ganged together to a common liquid source, e.g. an elevated tank or a pressure-operated supply network. As the amount of topping-up liquid varies from container to container, the topping-up times for the individual containers also vary. For this reason float valves are connected to a liquid source for extended periods of time, e.g. overnight in the case of traction batteries. It goes without saying that in such a case it must be ensured that the float valves securely close upon reaching the desired liquid level despite liquid pressure still present. With conventional float valves for filling traction batteries, however, this is often not the case. In particular, if the supply pressure is only low, i.e. when an elevated tank is used as a liquid source and thus the static liquid pressure is equivalent to the difference in level between such tank and the traction batteries, this pressure is not sufficient to ensure secure closure of the valve so that liquid continues, if only slowly, to flow, or drip, through the valve. However, even when the loss of liquid is low, it may cause the liquid in the container to rise above the permissible level or even flow over. This means that the closing pressure for filling system float valves should be as low as possible in order to prevent subsequent dripping even when the liquid pressure is low. The shut-off pressure should be so low that when a plurality of float valves is connected in series, the liquid pressure in the last float valve, which, due to line resistance, will be lower than in the first float valves, should be sufficient to keep the last float valve securely shut.

On the other hand, the float valve should be designed in a manner that permits setting the filling pressure as high as possible in order to fill container as quickly as possible; filling systems for traction batteries, for instance, use pressures up to 4 bar. In spite of this high pressure the float valve is expected to function trouble-free and respond quickly in spite of the strong flow forces to ensure timely shut-off when the desired liquid level has been reached. Here, too, problems arise with conventional float valves for filling traction batteries.

A specific problem in filling traction batteries is sometimes hydrogen explosions. If a hydrogen explosion occurs in one battery when several traction batteries are filled in series, care must be taken to release the hydrogen quickly into the atmosphere. However, sometimes it happens that part of the explosive gases enter the line system interconnecting the individual float valves. This way the the explosive gases may pass over into a battery connected next and ignite the hydrogen gas present there, which may result in severe damage. Apart from this, good ventilation of the float valves and the containers must be ensured in other filling systems to prevent the action of explosive gases on float valves connected next.

Furthermore, conventional float valves are relatively complicated in design so that they cannot be manufactured economically, for instance, by injection moulding. Accordingly, the price of such float valves is high.

The object of the present invention is to provide a float valve of the type dealt with herein which, simple in construction, functions trouble-free under low as well as under high filling pressures and which can be securely closed and kept closed even under only low pressures and which very rapidly shuts off the flow of liquid when the desired liquid level has been reached.

The aforementioned object of the present invention is attained by the features set forth in the characterizing part of claim 1 hereto.

By providing a distribution chamber in the feed line before the valve chamber and inlets as large as possible within the bottom area of the valve chamber along its side walls, the valve chamber is uniformly flown through through between the inlets and the outlet which preferably is disposed in the ceiling of the valve chamber, the valve head essentially resting outside this flow in a recess below the valve head. As the liquid rises to the desired level, the float will rise accordingly and lift the valve head out of the recess in the bottom of the valve chamber via the valve stem. In this instant the entire underside of the valve head enters the flow thus being rapidly pushed into the closed position. In order to fully exploit the flow forces, the valve head has approximately the same diameter as the valve chamber, however, it moves in same with some play. The upper part of the valve head is rounded and is shaped, for instance, like a flat spherical shell which, in the closed position, directly seats against a valve seat or, in the most simple design, seats an O-ring surrounding the outlet opening in the ceiling of the valve chamber. This design of the valve head and the valve seat has the advantage that the valve is reliably shut even when the valve head position is slightly slanted.

The shape of the lower part of the valve head is not as critical, however, it is to be ensured that even when the valve head is only slightly lifted from the recess in the bottom the underside of the valve head is essentially exposed to the entire flow to boost the closing action as much as possible. The shape of the lower part may also be rounded off and e.g. have the shape of a spherical shell. Other, conoid, shapes are also possible.

Likewise the shape of the recess in the bottom of the valve chamber is for the most part selectable; a conical recess is to be preferred for manufacturing reasons. In any case the lower part of the valve head and the recess should be shaped in such a manner that the valve head can be held approximately centered in the recess. Furthermore, the outer rim of the valve head separating the upper part of the valve head from the lower part should rest approximately at the level of the upper outer rim of the recess or, if necessary, somewhat below the upper rim to ensure that the valve head positioned in the recess is not caught by the flow and pushed towards the closed position. Due to such a design of the valve head, the recess, and the valve chamber precise performance can be ensured despite short valve actuating travel even with varying filling pressures.

In addition to the valve housing the float valve according to the present invention may be provided with a stack open to the valve housing and the container to be filled, to ensure efficient escape of gases during filling. Any explosive gases are quickly removed via this stack. Moreover, the liquid supply system to the valve chamber will be fitted with a trap disposed within the float valve and containing a water barrier to prevent explosive gases from passing over into the float valve connected before/after.

Further embodiments of the present invention are described in the sub-claims in more detail.

The present invention is made more apparent in a preferred embodiment with reference to the accompanying drawings in which FIG. 1 is a section along ABEFG in FIG. 3 of a float valve according to the present invention;

Figure 1:
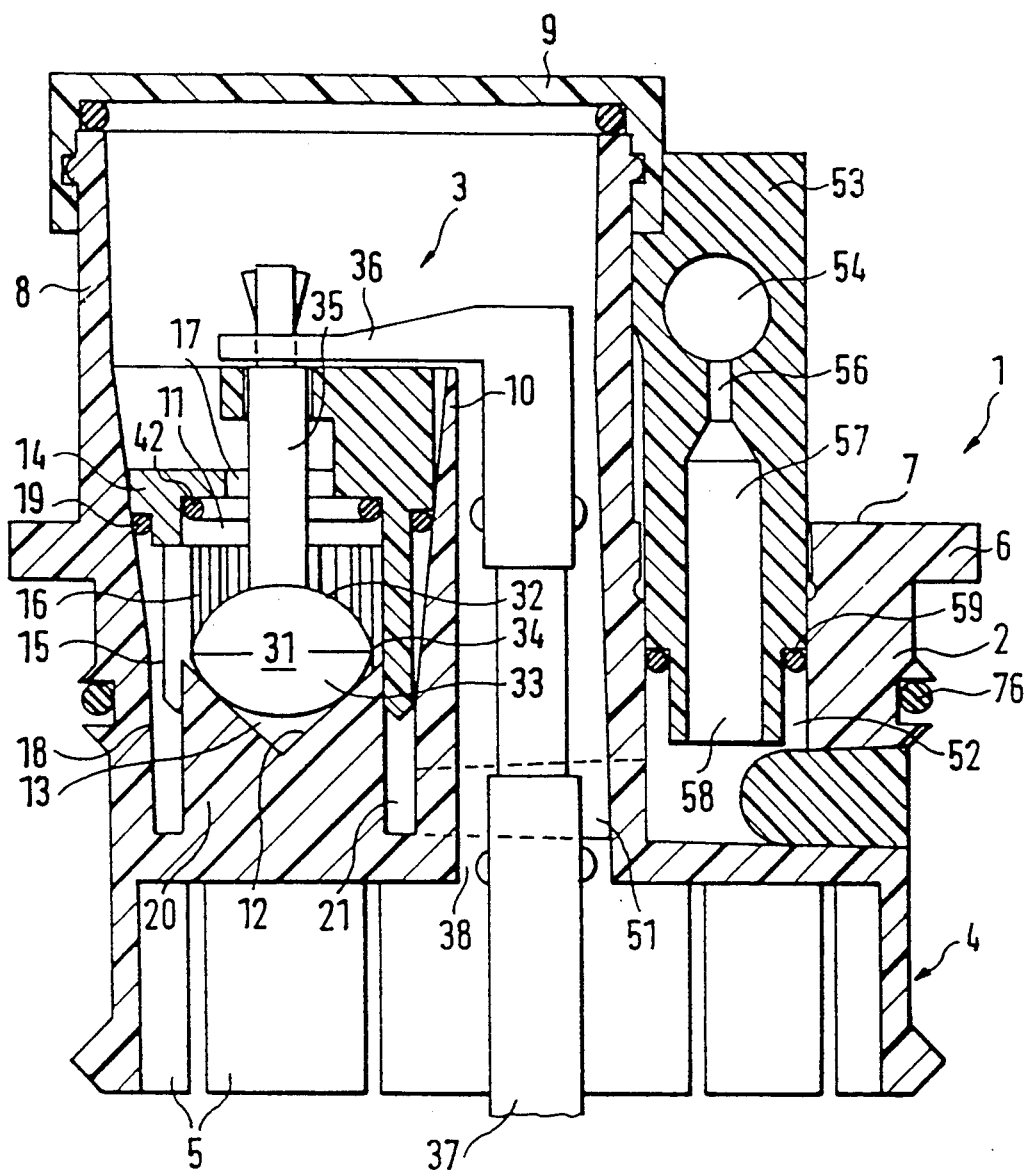
Figure 2:
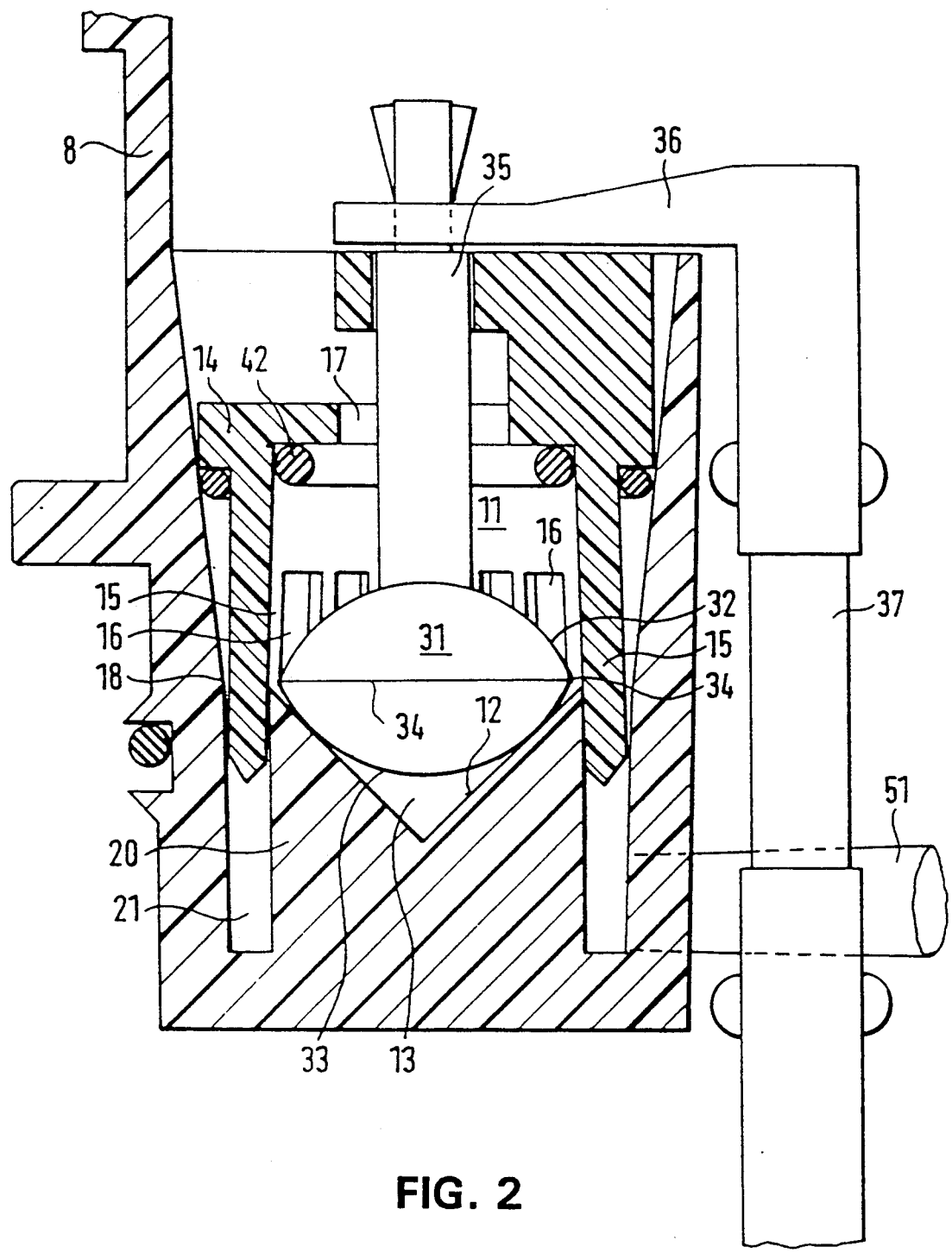
FIG. 2 is a detail of the float valve within the valve chamber area.

In FIG. 1, 1 designates a plug in whose housing, which is made from synthetic material, is disposed a float valve 3. The lower part of the housing 2 features a neck 4 with a plurality of sections 5 and can be fitted into the filling opening of a traction battery where it rests on a circular collar. The upper part of the collar 6 consists of a somewhat cylindrical valve housing 8 that can be topped with a cover 9 and which accommodates another, pot-like, housing 10 for a valve chamber 11.

The bottom of the housing 10 and thus of the valve chamber 11 features a conical portion 12 consisting a recess 13 in the form of a cone pointing downwards. The valve chamber 11 is bounded at the sides and the top by a cylindrical insert 14 whose lateral walls consist of a plurality of teeth 15 with relatively wide slots 16 disposed between them and whose ceiling features a central orifice 17. The teeth 15 of the insert 14 are fitted into an annular gap surrounding the conical portion of the valve chamber bottom 12 and held in position by the rim of the insert ceiling and additionally, for example, an O-ring pressing against the slightly inclined walls of the pot-shaped housing 10. An annular gap 18 extends downwards beyond the ends of the teeth 15, thus surrounding a cylindrical stump 20 the top of which is the conical chamber bottom 12, so that a distribution chamber 21 is formed.

The valve chamber section of FIG. 1 shows a valve head 31 whose sectional area is somewhat oviform, which, as shown in FIG. 1, can be accommodated in the recess 13 and whose diameter is only slightly smaller than that of the chamber 11. The shape of the upper part of the valve head resembles that of a flat, convex spherical shell 32; the lower part 33 is rounded in the same manner so that it more or less matches the shape of the recess 13. The outer rim 34 of the valve head 31, i.e. the line separating the upper from the lower part, is shown approximately level with the upper outer rim of the recess 13.

Fastened to the centre of the upper part 32 of the valve head 31 is a valve stem 35 extending upwards through the central orifice 17 in the ceiling of the insert 14 where it is linked to the arm 36 of a float rod 37 which outside the pot-like housing 10 extends downward through an opening 38 in the bottom of the plug housing 2 and bears a float 39 at its lower end. This float, for example, may consist of a closed hollow cylinder filled with air. To simplify manufacture, however, a cylinder 40 open at the bottom should be used, stuffed with pressed-in open-pore synthetic material 41.

As the float 39 is pushed upwards, the arm 36 of the float rod 37 pushes the valve stem 35, thus causing the valve head 31 to move upwards, too, until its upper part 32 is stopped by an O-ring 42 disposed at the ceiling of the insert 14 and surrounding the central orifice 17 thereof. Thus the O-ring acts as a valve seat. When the valve head 31 seats the O-ring 42 also the orifice 17 is shut off to the outside.

Figure 4:
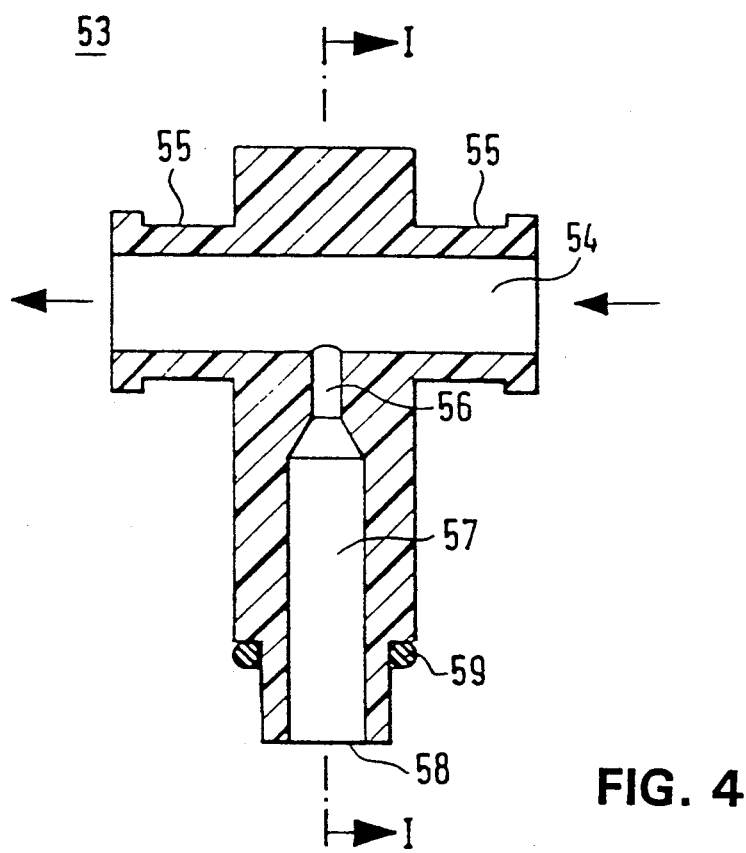
FIG. 4 is a section of a fitting for supplying liquid to the float valve.
Figure 5:
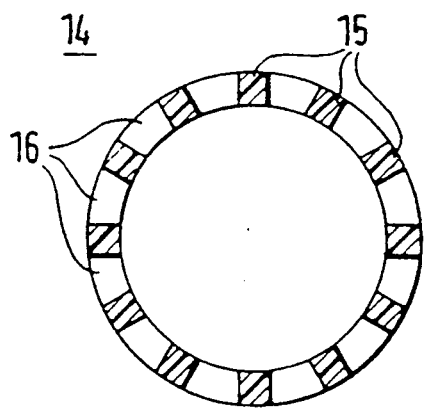
FIG. 5 is a section of a distribution insert covering the valve chamber of the float valve.
Figure 6:
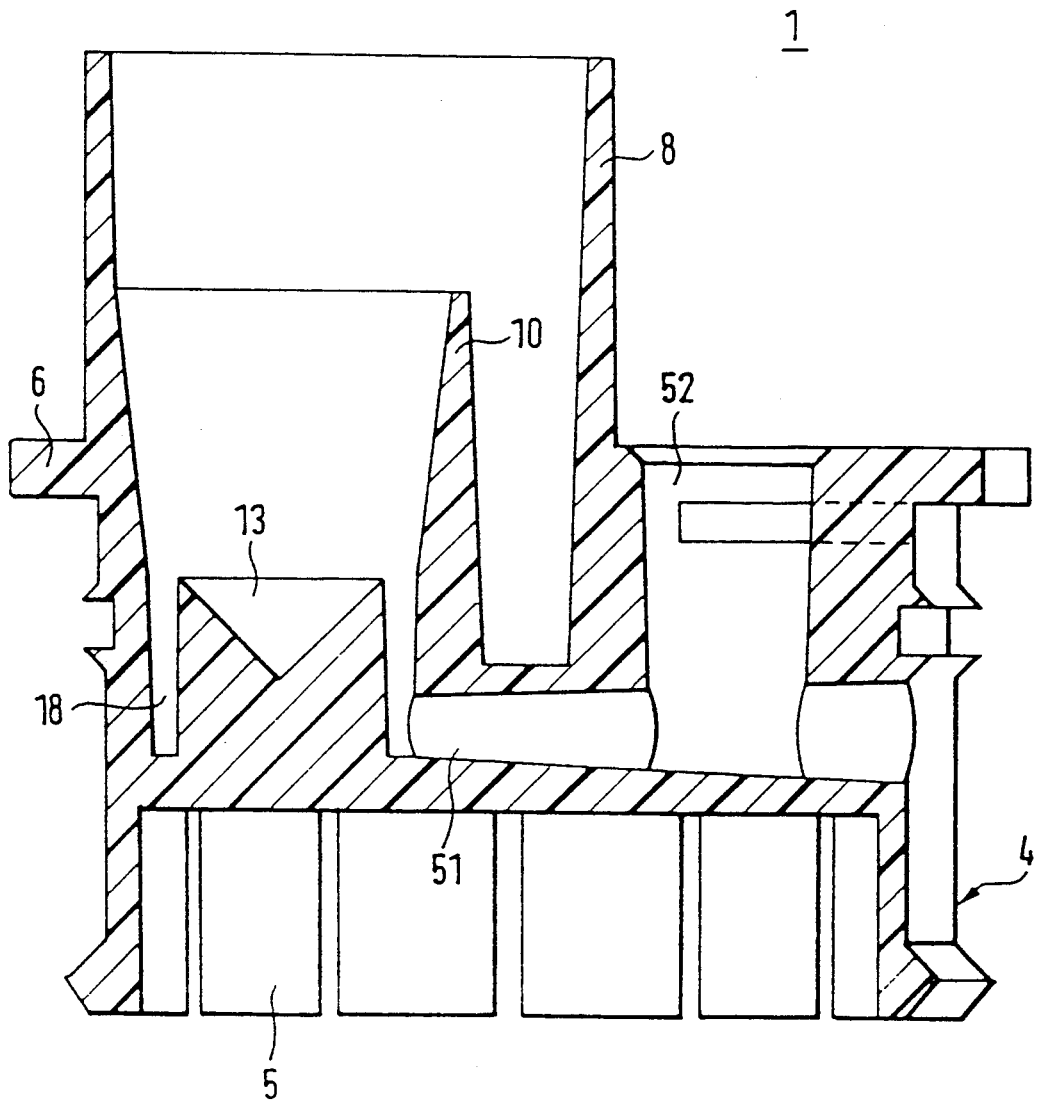
FIG. 6 is a section along ABFG of FIG. 3 of the float valve housing.

As shown in FIG. 1 by the broken line and shown in detail in FIG. 6, a cross channel 51 which extends from a branch channel 52, which is vertically disposed in the plug housing beside the valve housing 8, extends into the distribution chamber 21 at the bottom of the annular gap 18. Inserted into this branch channel 52 is a rod-shaped fitting 53 which is shown in more detail in FIG. 4. The upper part of this fitting 53 features a channel 54 with two lateral connections 55, a jet channel 56 branching from the cross channel 54 extending into a wide passage 57 with an opening 58 at the bottom of the fitting 53. The fitting 53 is held in the branch channel 52 and sealed with an O-ring 59. To one of the connections 54 a flexible hose is fitted which leads to a distilled/purified water source, the other connection 54 is either closed or connected with the fitting of another float valve via another flexible hose.

As depicted in FIGS. 1 and 6, the valve chamber 11, the distribution chamber 21, the cross channel 51, the branch channel 52, and the wide passage 57 constitute a trap whose lowest point is the cross channel 51.

Figure 3:
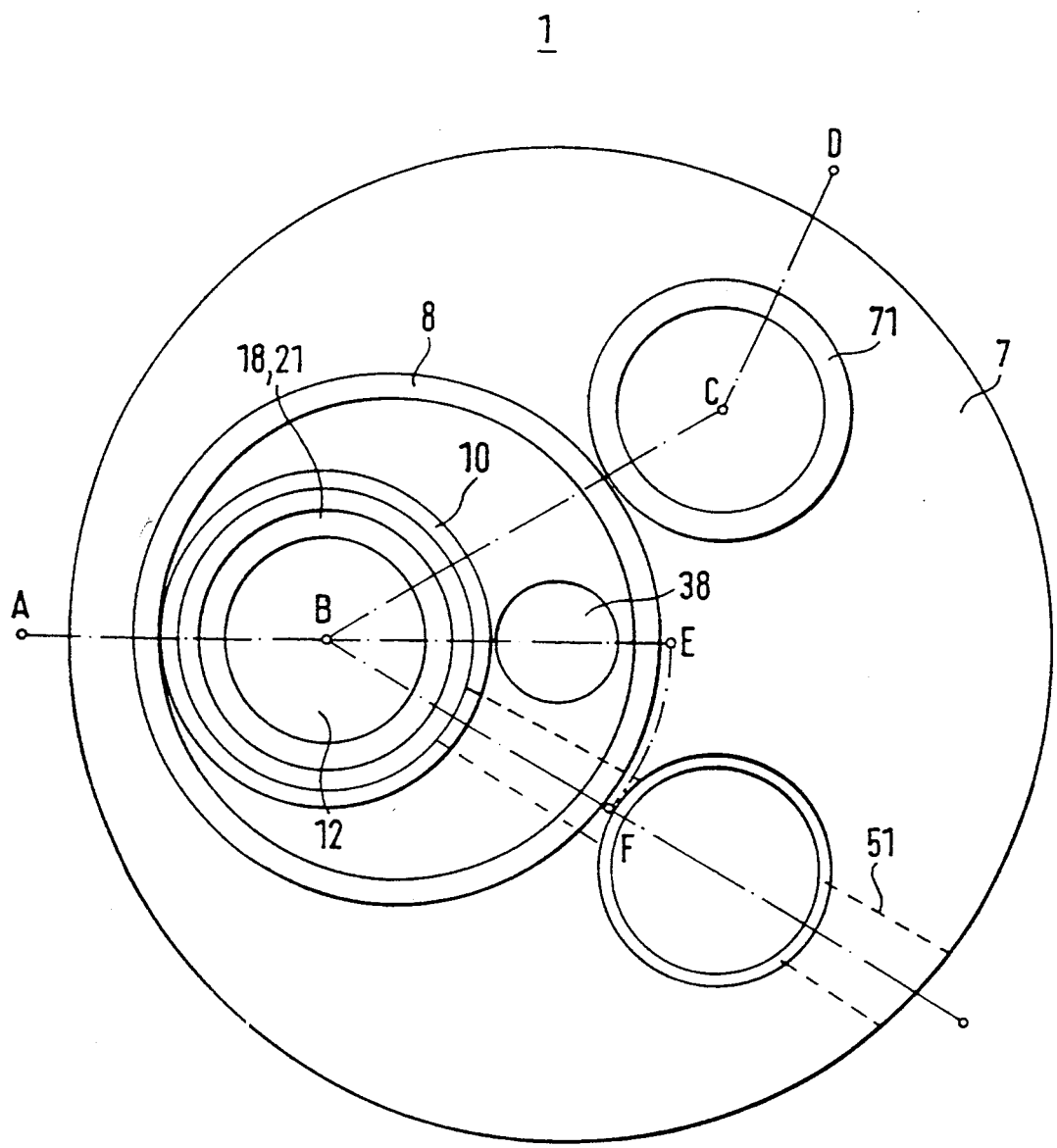
FIG. 3 is a top view of the float valve housing to explain the sections shown in the other Figures.
Figure 7:
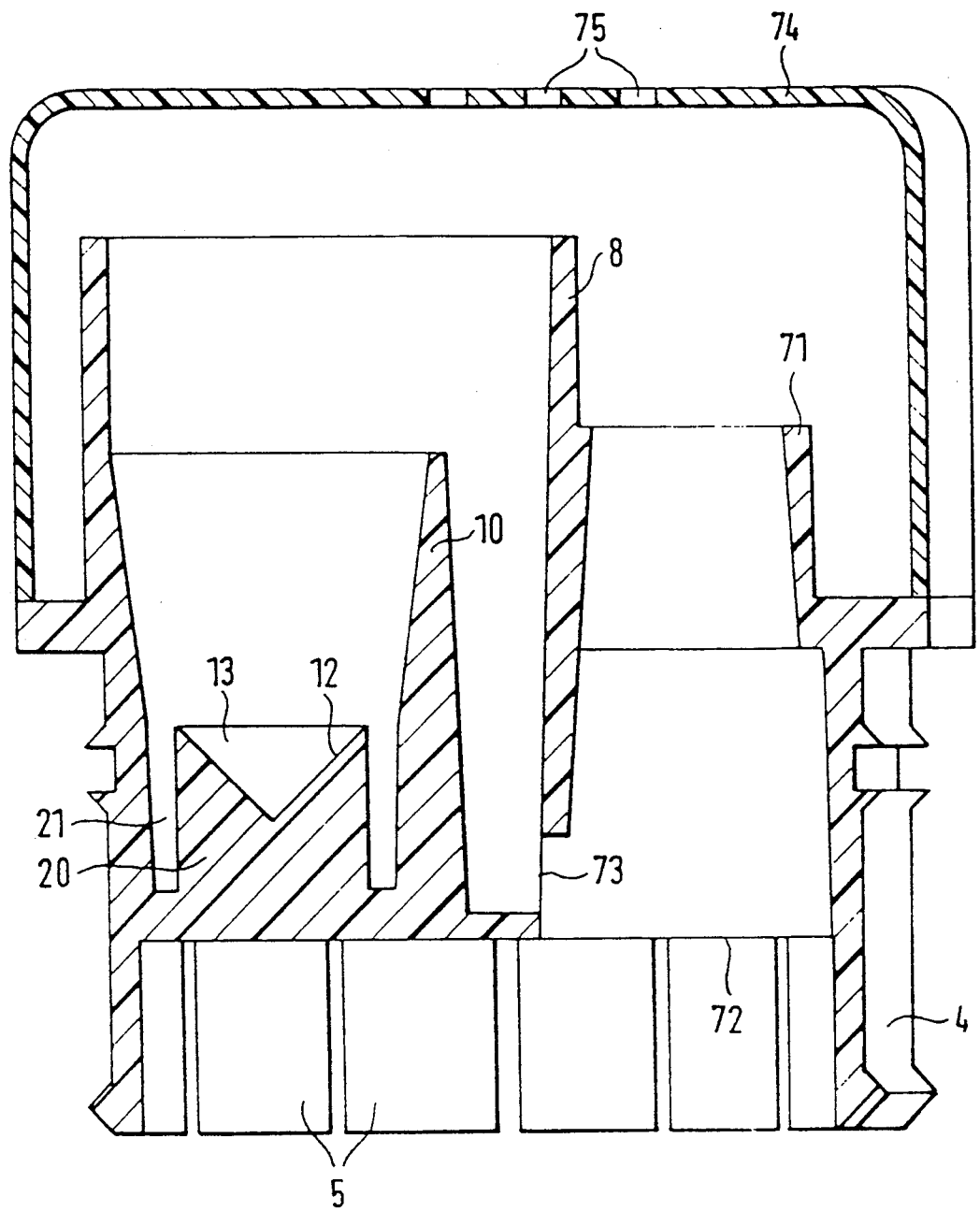
FIG. 7 is a section along ABCD of FIG. 3 of the float valve housing.

As illustrated in FIGS. 3 and 7, sort of a stack 71 rises above the collar 6 of the plug housing 2 beside the valve housing 8, extending through the bottom of the plug housing 2 thus providing a downward opening 72. The wall between the stack 71 and the valve housing 8 features a port 73 in its lower section, thus connecting the interior of the valve housing 8 with the stack 71. The stack 71 can be closed, for instance, with a separate cap. There is also the possibility of placing a cover cap 74 with several gas vent holes 75 on the collar 6 of the plug 1 as shown in FIG. 7, in which case the cover cap 74 would cover the entire upper surface area of the plug 1 together with the float valve 3 disposed therein.

The float valve described has the following function in a traction battery filling system:

For filling traction batteries, a plug 1 incorporating a float valve is inserted in the battery filling/checking openings. The plug is firmly held in position by the resilient sections 5. An additional O-ring is fitted to the flange 6 for gas-tightness. One end connection 54 of a fitting 53 of a float valve is connected to a distilled/purified water source, and the other end connection, and the end connections of the other fittings are connected in series; the last end connection is closed. Now the water can be introduced into the line system, usually at operating pressures up to 4 bar. In each plug the water will flow into the distribution chamber 21 via the jet channel 56, the longitudinal channel 57 and the cross channel 51, distribute uniformly around the stump 20, rise in the distribution chamber 21, and enter the valve chamber through the slots 16 above the upper rim of the recess 13; the water will leave the valve chamber through the orifice 17 in the ceiling of the insert 14. Then the water will flow through the valve housing 18, around the float rod 37, downwards, entering the traction battery through opening 38.

The slots 16 are dimensioned in width and height so as to keep flow resistance in the valve chamber to a minimum. During filling, the valve head 31 remains in its position within the recess 13, with the liquid flow passing above it and practically no flow forces acting on it.

When the required liquid level of the battery has been reached, the float 39 will rise, causing the valve head 31 to be lifted from the recess 13. As soon as the external rim 34 of the valve head 31 enters the flow, the lower part 32 of the valve head will be exposed to the flow forces so that the valve head 31 is quickly pushed upwards to seat the O-ring 42 with its upper part 32, thereby shutting off the opening 17. As the diameter of the valve head 31 approximates the diameter of the valve chamber and the entire lower part of the valve head is exposed on being lifted from the recess 13, the flow energy is practically fully utilized for the closing action.

The valve head is held in the closed position by the float rod 37 and to a great deal by the pressure present in the valve chamber 11. Owing to the rounded shape of the upper part 32 of the valve head and the valve head 31 seating the O-ring 42, positive shut-off of the opening 17 is ensured even at very low pressures. In practice, this shut-off pressure is approx. 0.12 bar. Thus even with low supply pressures the risk of dripping in the closed position of the valve with all the disadvantages mentioned above is eliminated.

During the filling process, the venting of the interior of the traction battery is through the stack 71. If a hydrogen explosion should occur in a battery, the explosion pressure will quickly be discharged via the stack 71. Any back pressure of hydrogen gas via the float valve 3 and the pipe system on the fitting 53 to other float valves connected is prevented on the one hand by said trap which is filled with water also when the battery has been topped up, thus forming a gas barrier, and on the other hand, even when the gas barrier has been displaced, by the residual gas escaping from the valve housing via the aperture 73 and the stack 71 into the atmosphere.

The plug and all parts of the float valve are made from acid- and base-resistant synthetic material so that the float valve can also be used, for instance, for filling traction batteries with an electrolyte.

The design of the float valve as described sets an example, especially with regard to the distribution and valve chambers. However, it must be ensured that the filling medium is distributed uniformly over the valve chamber walls and enters the valve chamber near its bottom, and that the valve head in the open position is mainly located outside the flow, but, during the closing process, is pushed into the closing position by the flow forces. Instead of the illustrated slots that serve as valve chamber inlets, other types of inlet can be used, e.g. individual intake channels, or horizontally disposed annular openings etc.

What I claim is:

1. A vertical float valve for a container filling system comprising:
   a valve chamber (11) having a plurality of inlets (16) for a filling fluid and an outlet (17) leading to a container,
   a valve head (31) positioned in the valve chamber (11) and connected to a float (39) via a valve stem (35) and a float rod (37),
   the valve head (31) being movable in the valve chamber (11) from an inlet open position to an outlet close position and vice versa,
   a supply conduit (51), for supplying the fluid to the valve chamber (11), communicating with a distribution chamber (21) which surrounds the valve chamber (11) and communicates with the plurality of valve chamber inlets (16), the plurality of valve chamber inlets (16) being located within a side wall of the valve chamber (11) and being space about the entire perimeter thereof,
   the outlet of the valve chamber (11) being a discharge opening (17) located in an upper portion of the valve chamber (11), through which extends the valve stem (35), whereby the valve stem (35) is movable within a certain area relative to an arm (36) of the float rod (37),
   the valve head (31) having an upper and a lower part (32, 33) separated by a rim (34),
   the upper part (32) of the valve head (31) being shaped for sealing engagement with a valve seat (42) surrounding the discharge opening (17),
   the valve head (31), when in the open position, being in a recess (13) in the bottom of the valve chamber (11) with the rim (34) lying immediately below the plurality of valve chamber inlets (16), whereby the valve head (31) allows unobstructed fluid flow through the valve chamber (11),
   the plurality of valve chamber inlets (16), the recess (13) and the valve head (31) being arranged such that the entire underside of the valve head (31) is exposed to essentially the entire flow of fluid of the valve chamber (11) as soon as the valve head (31) moves away from the recess (13) thereby boosting a closing action of the valve head (31) against the valve seat (42), whereby the rim (34) guides the valve head along the plurality of valve chamber inlets (16).

2. A float valve according to claim 1, wherein the diameter of the valve head (1) across the direction of travel is only slightly smaller than that of the valve chamber (11).

3. A float valve according to claim 1, wherein the valve head (31) is rotationally symmetrical relative to its displacement axis which coincides with the axis of the valve chamber and has an outer rim (34) with the largest diameter separating the upper part (33) from the lower part (32) of the valve head (31), and the lower part of the valve head (31) below this rim (34) tapers in the direction of the displacement axis.

4. A float valve according to claim 3, wherein the outer rim (34) of the valve head (31) is approximately level with the upper rim of the recess (13) when the valve head (31) rests in the recess (13) in the bottom of the valve chamber.

5. A float valve according to claim 1, wherein the shape of the lower part (32) of the valve head (31) is approximated to the shape of the recess (13) in the bottom of the valve chamber (11).

6. A float valve according to claim 1, wherein the lower part (33) of the valve head (31) which faces the recess (13) in the bottom of the valve chamber (11) has a smooth convex surface which resembles the shape of a flat spherical shell.

7. A float valve according to claim 1, wherein the shape of the recess (13) in the bottom of the valve chamber (11) is conical.

8. A float valve according to claim 1, wherein the upper part (32) of the valve head (31) which faces the ceiling of the valve chamber (11) has a smooth convex surface which resembles the shape of a flat spherical shell.

9. A float valve according to claim 1, wherein the lower part (33) of the valve head (31) which faces the recess (13) in the bottom of the valve chamber (11) has a smooth convex surface which resembles the shape of a flat spherical shell, wherein the upper part (32) of the valve head (31) which faces the ceiling of the valve chamber (11) has also a smooth convex surface which resembles the shape of a flat spherical shell, and wherein the diameter of the outer rim (34) separating the upper part from the lower part is the greatest diameter of the valve head and only slightly smaller than that of the valve chamber (11).

10. A float valve according to claim 1, wherein the valve seat in the ceiling of the valve chamber (11) consists of an O-ring (42) that surrounds the outlet orifice (17).

11. A float valve according to claim 1, wherein the distribution chamber (21) consists of an annular space whose axis coincides with the axis of the valve chamber (11) and the direction of displacement of the valve head (31) and this annular space (21) is provided with inlets (16) leading into the valve chamber (11).

12. A float valve according to claim 11, wherein the annular space (21) surrounds the valve chamber (11) in the bottom area of the latter and below.

13. A float valve according to claim 11, wherein the supply inlet (51) of the annular space (21) preferably enters the annular space (21) in the bottom area on one end of its axis and the inlets are located at its other end, preferably at the ceiling of the annular chamber (21).

14. A float valve according to claim 1, wherein the side walls and the ceiling of the valve chamber (11) are formed by an insert (14) in the manner a cage is formed, and the side walls of the insert (14) have slots (16) which constitute the valve chamber (11) inlets.

15. A float valve according to claim 1, wherein the supply system in the float valve (3) between the filling medium inlet (55) and the valve chamber (11) forms a trap system (57, 51, 21, 11).

16. A float valve according to claim 1, wherein the float valve (3) features a stack (71) which is open on both sides and which is located beside the valve housing (8) of the float valve (3) and whose one opening faces the container to be filled, and the wall between the stack (71) and the valve housing (8) is provided with a port (73).

* * * * *